(12) United States Patent
Nakamoto (10) Patent No.: US 10,513,816 B2
(45) Date of Patent: Dec. 24, 2019

(54) DRUM WASHING MACHINE

(71) Applicants: HAIER ASIA CO., LTD., Tokyo (JP); QINGDAO HAIER WASHING MACHINE CO., LTD., Shandong (CN)

(72) Inventor: Shigeharu Nakamoto, Tokyo (JP)

(73) Assignees: Haier Asia Co., Ltd., Tokyo (JP); Qingdao Haier Washing Machine Co., Ltd., Shandon (CN)

( * ) Notice: Subject to any disclaimer, the term of this patent is extended or adjusted under 35 U.S.C. 154(b) by 289 days.

(21) Appl. No.: 15/501,287

(22) PCT Filed: Aug. 5, 2015

(86) PCT No.: PCT/CN2015/086185
§ 371 (c)(1),
(2) Date: Feb. 23, 2017

(87) PCT Pub. No.: WO2016/019877
PCT Pub. Date: Feb. 11, 2016

(65) Prior Publication Data
US 2017/0218551 A1   Aug. 3, 2017

(30) Foreign Application Priority Data

Aug. 5, 2014   (JP) ................................. 2014-159927

(51) Int. Cl.
*D06F 37/30* (2006.01)
*F16D 11/14* (2006.01)
(Continued)

(52) U.S. Cl.
CPC .............. *D06F 37/30* (2013.01); *D06F 23/02* (2013.01); *D06F 23/06* (2013.01); *D06F 37/04* (2013.01);
(Continued)

(58) Field of Classification Search
CPC .......... D06F 37/40; D06F 23/02; D06F 23/06; D06F 37/30; D06F 37/04; F16D 11/14; F16D 2011/004
See application file for complete search history.

(56) References Cited

U.S. PATENT DOCUMENTS 2,296,262 A * 9/1942 Breckenridge ......... D06F 33/00
68/12.02
2,699,683 A * 1/1955 Castner ................... D06F 13/02
192/3.23
(Continued)

FOREIGN PATENT DOCUMENTS

CN        2576758 Y    10/2003
CN        1453416 A    11/2003
(Continued)

OTHER PUBLICATIONS

Search Report dated Feb. 15, 2018 from European Patent Application No. EP15829880, filed Aug. 5, 2015.
(Continued)

*Primary Examiner* — Benjamin L Osterhout
(74) *Attorney, Agent, or Firm* — David B. Tingey; Bryant J. Keller; Kirton McConkie (57) ABSTRACT

Provided is a drum washing machine, enabling a drum and a rotating body to rotate by a driving part, wherein the driving part includes: a driving motor; a first rotating shaft; a second rotating shaft; drum belt wheels; wing belt wheels; and a clutch mechanism part switching a driving form of the driving part between a biaxial driving form and a uniaxial driving form, wherein the biaxial driving form is a form that enables the drum and the rotating body to rotate at different rotating speeds through connecting the second rotating shaft and the wing belt wheels, and the uniaxial driving form is a form that enables the drum and the rotating body to rotate at
(Continued)

a same rotating speed through connecting the second rotating shaft and the drum belt wheels.

10 Claims, 8 Drawing Sheets

(51) Int. Cl.
    *D06F 23/02*     (2006.01)
    *D06F 37/04*     (2006.01)
    *D06F 23/06*     (2006.01)
    *D06F 37/40*     (2006.01)
    *F16D 11/00*     (2006.01)

(52) U.S. Cl.
    CPC .............. *D06F 37/40* (2013.01); *F16D 11/14* (2013.01); *F16D 2011/004* (2013.01)

(56) References Cited

U.S. PATENT DOCUMENTS

| | | | | |
|---|---|---|---|---|
| 2,942,447 | A * | 6/1960 | Rickel | D06F 25/00 474/27 |
| 2,963,892 | A * | 12/1960 | Edwards | D06F 37/22 248/146 |
| 3,033,014 | A * | 5/1962 | Neyhouse | D06F 37/40 68/140 |
| 3,322,278 | A * | 5/1967 | Ishoy | D06F 37/203 192/85.54 |
| 2002/0116961 | A1 * | 8/2002 | Kim | D06F 37/304 68/23.7 |
| 2003/0051516 | A1 * | 3/2003 | Lee | D06F 37/40 68/23.6 |
| 2005/0011233 | A1 * | 1/2005 | Vaidhyanathan | D06F 37/145 68/23.7 |
| 2009/0229312 | A1 * | 9/2009 | Chung | D06F 39/083 68/12.19 |

FOREIGN PATENT DOCUMENTS

| | | |
|---|---|---|
| CN | 1888197 A | 1/2007 |
| CN | 1888202 A | 1/2007 |
| CN | 104032542 A | 9/2014 |
| CN | 203890713 U | 10/2014 |
| CN | 203890716 U | 10/2014 |
| EP | 1439255 A1 | 7/2004 |
| EP | 2025791 A1 | 2/2009 |
| JP | 56-66291 | 6/1981 |
| JP | S59-156388 A | 9/1984 |
| JP | 3280992 A | 12/1991 |
| JP | 2008104684 A | 5/2008 |
| KR | 950007852 B1 | 7/1995 |
| KR | 20050087342 A | 8/2005 |

OTHER PUBLICATIONS

Office Action dated Apr. 18, 2018 from Japanese Patent Application No. JP2014-159927, filed Jun. 4, 1981.
International Search Report dated Nov. 11, 2015 from International Patent Application No. PCT/CN2015/086185, filed Aug. 5, 2015.
International Search Report dated Nov. 12, 2015 from International Patent Application No. PCT/CN2015/086174, filed Aug. 5, 2015.
International Search Report dated Nov. 17, 2015 from International Patent Application No. PCT/CN2015/086187, filed Aug. 5, 2015.

* cited by examiner

DRUM WASHING MACHINE

CROSS REFERENCE TO RELATED APPLICATION(S)

This application is a U.S. National Stage Entry of International Patent Application No. PCT/CN2015/086185, filed Aug. 5, 2015, which claims the benefit of Japanese Patent Application No. 2014-159927, filed Aug. 5, 2014, the disclosures of which are hereby incorporated entirely herein by reference.

TECHNICAL FIELD

The present disclosure relates to a drum washing machine, which not only can be continuously operated from washing to drying, but also can carry out washing without drying.

BACKGROUND

In the past, a drum washing machine rotates a transverse-shaft type drum in an outer tank which stores water at the bottom, washings are lifted up and dropped down by baffles arranged in the drum, and the washings are thrown to an inner circumferential surface of the drum to realize washing.

In this way, in a structure of stirring the washings by the baffles, the washings are difficult to twine or rub against each other. Therefore, compared with an automatic washing machine which washes the washings through rotation of a pulsator in a washing and dewatering tank, the drum washing machine has mechanical force, acting on the washings, easy to get small, and has detergency easy to lower.

Therefore, in the drum washing machine, in order to improve the detergency, a structure that a rotating body with a protruding part on the surface is arranged at the end part of the drum and the drum and the rotating body can rotate at different rotation speeds during washing and rinsing may be adopted. In the drum washing machine, in order to properly dewater the washings, the drum and the rotating body rotate at a same rotating speed during dewatering.

A driving part that enables the drum and the rotating body to rotate can be configured in a structure that the driving part is provided with a driving motor used for the drum and a driving motor used for the rotating body, the rotation of the driving motor used for the drum is transmitted to a rotating shaft of the drum by belts so as to enable the drum to rotate, and the rotation of the driving motor used for the rotating body is transmitted to a rotating shaft of the rotating body by the belts so as to enable the rotating body to rotate (with reference to a patent literature 1).

CURRENT TECHNICAL LITERATURE

Patent Literature

Patent Literature 1: Japanese Laid-Open Patent Publication No. 03-280992

SUMMARY

Problems to be Solved by the Disclosure

Under a situation that a driving part is configured into the above structure, since a drum and a rotating body can generate a rotating speed difference by using a simple structure of speed-reducing mechanisms of belts and belt wheels, the reliability is high in the aspects of fault and the like compared with the situation of using a speed-reducing mechanism of gears. However, since two driving motors are used for enabling the drum and the rotating body to rotate, it is difficult to form the driving part at low cost.

In addition, as described above, the drum and the rotating body need to integrally rotate at a same rotating speed during dewatering, but in the above structure, rotating speeds of the two driving motors possibly have a difference when the drum and the rotating body bear different sizes of loads from washings and the like. In this way, the drum and the rotating body can rotate at different rotating speeds, possibly causing improper dewatering.

The present disclosure is completed in view of the problems and aims at providing a drum washing machine which enables the drum and the rotating body to rotate by a driving part with low cost and high reliability.

Solution for Solving the Problems

The drum washing machine involved in a main manner of the present disclosure includes: an outer tank, configured in a shell; a drum, configured in the outer tank to rotate by using a horizontal axis or an inclination axis inclining relative to a horizontal direction; a rotating body, configured at the rear part of the drum and provided with a protruding parts in contact with the washings on the surface of the rotating body; and the driving part, configured to enable the drum and the rotating body to rotate. Herein, the driving part includes: a driving motor; a first rotating shaft, fixed on the drum; a second rotating shaft fixed on the rotating body; a first belt wheel, fixed on either the first rotating shaft or the second rotating shaft and connected with the driving motor by a first transmission belt; a second belt wheel, connected with the driving motor by a second transmission belt and having an outer diameter different from that of the first belt wheel; a clutch mechanism part, configured to switch a driving form of the driving part between a first driving form and a second driving form, wherein the first driving form is a form that enables the drum and the rotating body to rotate at different rotating speeds through connecting the other one of the first rotating shaft and the second rotating shaft with the second belt wheel in a manner that the rotation of the second belt wheel is transmitted to the other rotating shaft; and the second driving form is a form that enables the drum and the rotating body to rotate at a same rotating speed through connecting the other one of the first rotating shaft and the second rotating shaft with the first belt wheel in a manner that the rotation of the first belt wheel is transmitted to the other rotating shaft.

According to the above structure, since the drum and the rotating body can generate a rotating speed difference by using a simple structure of speed-reducing mechanisms of belts and belt wheels, the reliability of the driving part is improved in the aspects of fault and the like compared with the use of the speed-reducing mechanism of the gears. Additionally, since one driving motor is used for enabling the drum and the rotating body to rotate, the driving part is formed at low cost; and in the second driving form, even though the condition that the drum and the rotating body bear different sizes of loads from the washings and the like is generated, the drum and the rotating body are also difficult to rotate at different rotating speeds, so it is not easy to generate a condition of obstructing proper dewatering.

In the drum washing machine in the present manner, a structure that the second rotating shaft is wrapped in the first rotating shaft and rotates coaxially with the first rotating shaft is adopted. In addition, a structure that the first belt wheel and the second belt wheel are parallelly configured along an axial direction of the first rotating shaft and the second rotating shaft is adopted. At this moment, the clutch mechanism part includes: a clutch part, configured between the first belt wheel and the second belt wheel, capable of moving to the axial direction relative to the other rotating shaft and capable of rotating together with the other rotating shaft; and mobile mechanism parts, configured to enable the clutch part to move to the axial direction. A side of the first belt wheel and a side of the second belt wheel of clutch part are respectively provided with a first engaging part and a second engaging part, and a first engaged part and a second engaged part are respectively arranged on the first belt wheel and the second belt wheel. In the first driving form, the drum washing machine becomes a state that the clutch part moves to the side of the second belt wheel by the mobile mechanism parts, so that the second engaging part is engaged with the second engaged part, and the rotation of the second belt wheel is transmitted to the other rotating shaft by the clutch part; and in the second driving form, the drum washing machine becomes a state that the clutch part moves to the side of the first belt wheel by the mobile mechanism parts, so that the first engaging part is engaged with the first engaged part, and the rotation of the first belt wheel is transmitted to the other rotating shaft by the clutch part.

According to the above structure, the clutch mechanism part can be realized: under the condition that the driving part adopts the structure of using the speed-reducing mechanisms of the belts and the belt wheels, the clutch mechanism part can well switch the driving form of the driving part between the first driving form and the second driving form by the clutch part configured between the first belt wheel and the second belt wheel and the mobile mechanism parts configured to enable the clutch part to move.

Under the condition that the above structure is adopted, further, the clutch mechanism part is configured to include a structure that the clutch mechanism part includes an encircling part that encircles the clutch part in a manner that the clutch part freely rotates. In this case, the mobile mechanism parts are connected with the encircling part.

If such structure is adopted, since the non-rotatable encircling part is arranged, and the encircling part is connected with the mobile mechanism parts, the non-rotatable mobile mechanism parts are used to enable the rotating clutch part to move along the axial direction.

Under the condition that the above structure is adopted, further, the driving part can be configured into a structure with a bearing part supporting the first rotating shaft in a freely rotatable manner in the front of the one which is located at the front side in the first belt wheel and the second belt wheel. In this case, a recess for containing at least part of the bearing part is formed at one side of the bearing part of the belt wheel located at the front side.

If such structure is adopted, since the bearing part is overlapped with the belt wheel located at the front side along the front-and-back direction of the driving part, the dimension in the front-and-back direction of the driving part can be decreased. Therefore, since the outer tank and the drum can be enlarged in the front-and-back direction, the washing capacity can be increased.

In the drum washing machine in the present manner, the second belt wheel can be configured into a structure that can support the other rotating shaft in a freely rotatable manner.

The second belt wheel can also rotate with the rotation of the driving motor even though the second belt wheel is not connected with the other rotating shaft. If the above structure is adopted, in order to realize the rotation, the other rotating shaft is also used as a supporting shaft for supporting the second belt wheel in a freely rotatable manner. Therefore, since a supporting shaft does not need to be additionally arranged, the cost can be reduced; and in addition, under the condition that the supporting shaft is arranged, shaft alignment between the supporting shaft and the other rotating shaft is not needed, so that the assembling operation of the driving part becomes easy.

In the drum washing machine in the present manner, the first belt wheel can be fixed on the first rotating shaft. In addition, the driving form of the driving part may include a third driving form that enables the drum to rotate and enables the rotating body to be in a freely rotatable state. In this case, when the clutch mechanism part is in the third driving form, the second rotating shaft is not connected with either the first belt wheel or the second belt wheel.

According to the above structure, the driving form can be switched to the third driving form, e.g., in a washing process or in a rinsing process. Under the state that the outer tank stores water, the drum is rotated when the driving motor rotates, so that the washings are stirred by baffles.

At this moment, a state that the washings are pressed by the rotating body is easily formed at the rear side of the drum, and the rotating body is in a freely rotatable state, therefore, the rotating body easily rotates together with the washings when the washings are stirred by the baffles. Therefore, the situation that the washings are not easy to rotate can also not be generated even at the rear side of the drum, so that the washings do a same rotating action with the front side of the drum. Therefore, a rotating difference of the washings is not easy to be generated at the front side and the rear side of the drum, so it is not easy to generate twisting of the washings caused by the rotating difference.

In addition, in the third driving form, since the rotating body cannot rotate by the driving motor like the first driving form, the washings cannot be rubbed by the rotating body.

Therefore, through adoption of the above structure, washing and rinsing can be started or quitted by the third driving form, so that damage caused by the twisting and the friction of the washings is not easy to be generated, and gracile clothes can be washed and rinsed while the damage to the gracile clothes is inhibited.

Effects of the Disclosure

According to the present disclosure, the drum washing machine is provided, which can enable the drum and the rotating body to rotate by the driving part with low cost and high reliability.

The effects and the significance of the present disclosure may be further defined through the description of an implementation manner shown below. However, the implementation manner below is only one illustration when the present disclosure is implemented, and the present disclosure is not limited by a technical solution described by the implementation manner below.

DETAILED DESCRIPTION

A drum washing machine without a drying function as to an implementation manner of a drum washing machine of the present disclosure is described below with reference to the drawings.

Figure 1:
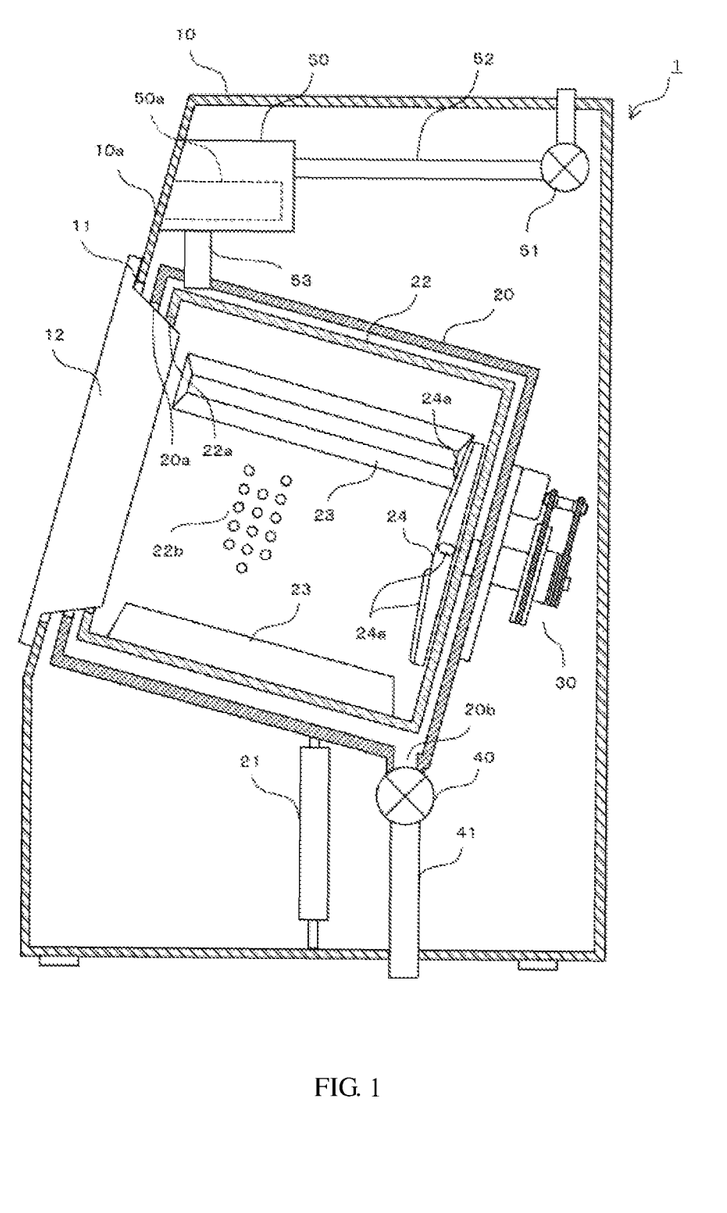
FIG. 1 is a side sectional view illustrating a structure of a drum washing machine involved in an implementation manner.

FIG. 1 is a side sectional view illustrating a structure of a drum washing machine 1.

The drum washing machine 1 is provided with a shell 10 forming an appearance. A front surface 10a of the shell 10 inclines from the central part to the upper part, a throwing inlet 11 of washings is formed on the inclined surface, and the throwing inlet 11 is covered by a freely openable/closable door 12.

An outer tank 20 is elastically supported by a plurality of shock absorbers 21 in the shell 10. A drum 22 is configured in the outer tank 20 in a freely rotatable manner. The outer tank 20 and the drum 22 incline in a manner that the rear surface sides become lower relative to a horizontal direction. Therefore, the drum 22 rotates by using an inclined shaft inclining relative to the horizontal direction as the center. The inclination angles of the outer tank 20 and the drum 22 are set as about 10-20 degrees. An opening part 20a of the front surface of the outer tank 20 and an opening part 22a of the front surface of the drum 22 are opposite to the throwing inlet 11 and are closed by the door 12 together with the throwing inlet 11. A plurality of dewatering holes 22b are formed in an inner circumferential surface of the drum 22. Then, three baffles 23 are arranged on the inner circumferential surface of the drum 22 at almost equal intervals along the circumferential direction.

A rotating body 24 is configured at the rear part of the drum 22 in a freely rotatable manner and is in an approximate disc shape. A plurality of protruding parts 24a radially extending from the central part are formed on the surface of the stirring body 24. The stirring body 24 and the drum 22 coaxially rotate.

A driving part 30 generating a torque for driving the drum 22 and the stirring body 24 is configured behind the outer tank 20. The driving part 30 enables the drum 22 and the stirring body 24 to rotate along the same direction at different rotating speeds in a washing process and a rinsing process.

Specifically, the driving part 30 enables the drum 22 to rotate at a rotating speed that the centrifugal force exerted on the washings in the drum 22 is less than the gravity of the washings and enables the stirring body 24 to rotate at a rotating speed higher than that of the drum 22.

In another aspect, the driving part 30 enables the drum 22 and the stirring body 24 to integrally rotate at a rotating speed that the centrifugal force exerted on the washings in the drum 22 is far more than the gravity of the washings in a dewatering process. A detailed structure of the driving part 30 is described subsequently.

A water outlet part 20b is formed at the bottom of the outer tank 20. A drainage valve 40 is arranged in the water outlet part 20b and is connected with a drainage hose 41. Water stored in the outer tank 20 is discharged out of the machine through the drainage hose 41 when the drainage valve 40 is opened.

A detergent box 50 is configured at the front upper part in the shell 10. A detergent container 50a containing detergent, which can be freely drawn out from the front of the detergent box 50, is contained in the detergent box 50. The detergent box 50 is connected with a water-feeding valve 51, which is configured at the rear upper part in the shell 10, through a water feed hose 52. In addition, the detergent box 50 is connected with the upper part of the outer tank 20 through a water injection pipe 53. Tap water from a faucet is supplied into the outer tank 20 through the water feed hose 52, the detergent box 50 and the water injection pipe 53 when the water-feeding valve 51 is opened. At this moment, the detergent contained in the detergent container 50a is supplied into the outer tank 20 along with a water flow.

Next, a structure of the driving part 30 is described in detail.

Figure 2:
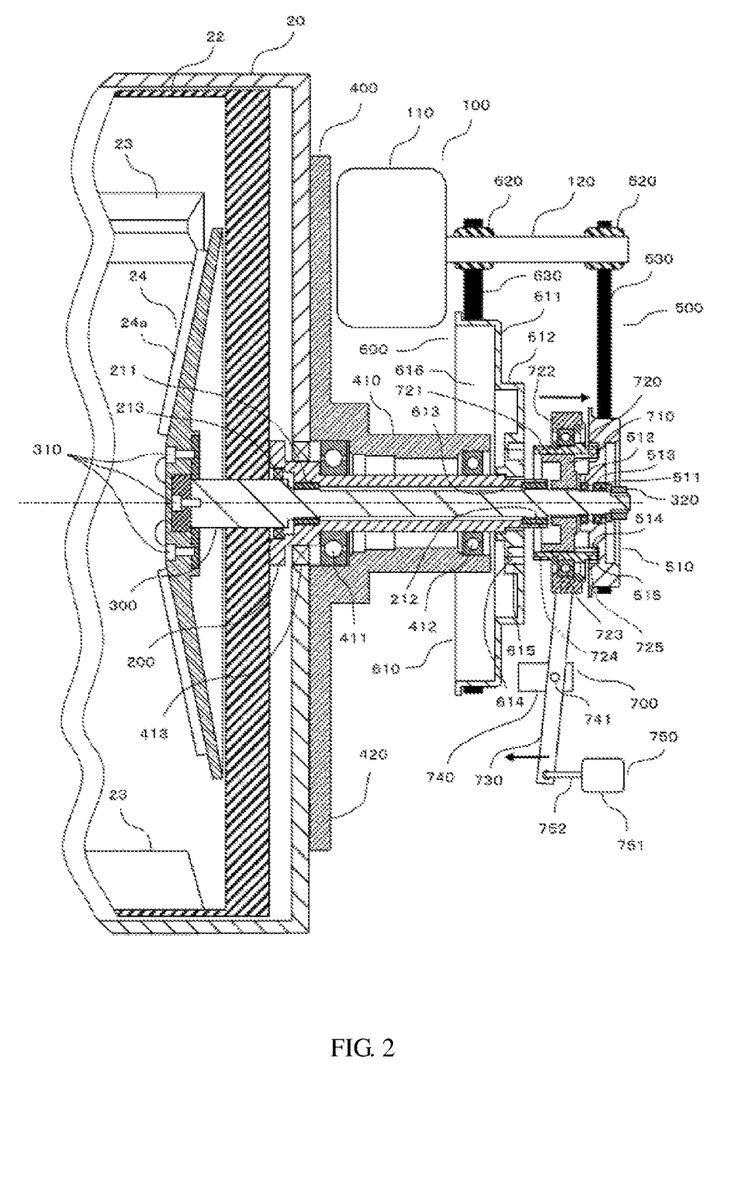
FIG. 2 is a sectional view illustrating a structure of a driving part involved in an implementation manner.
Figure 3:
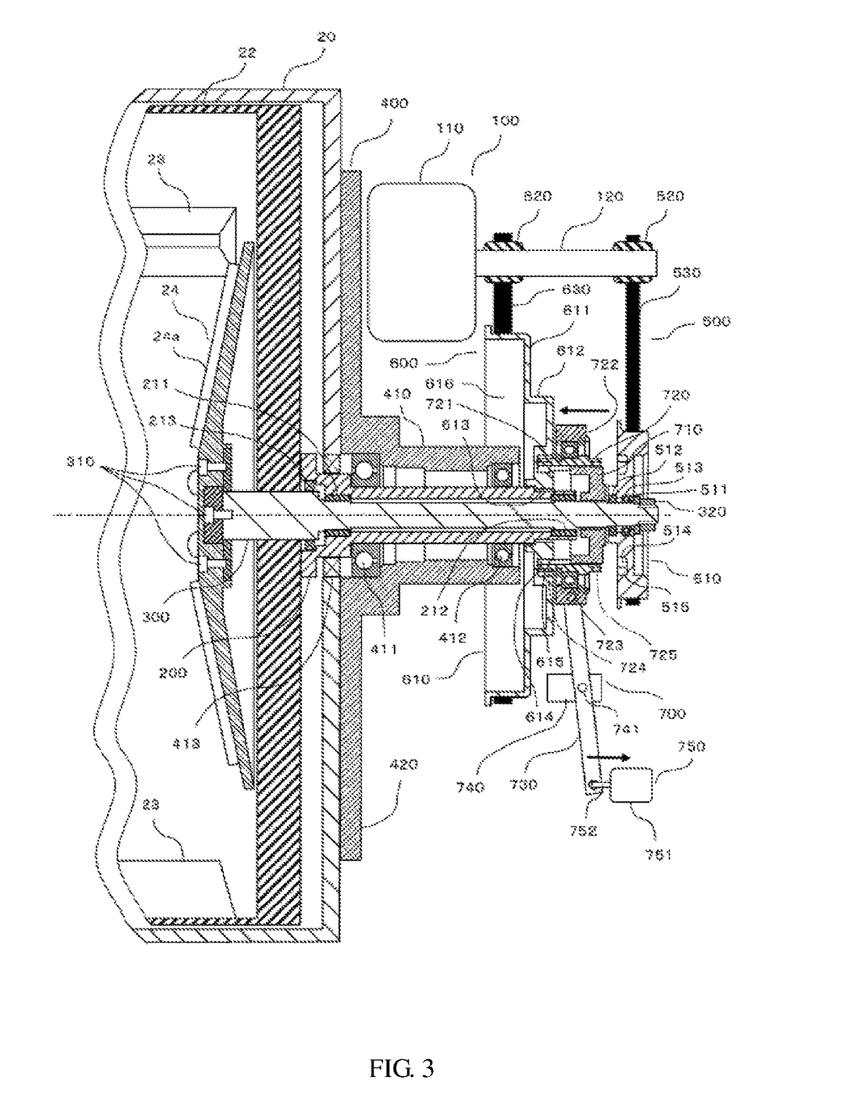
FIG. 3 is a sectional view illustrating a structure of a driving part involved in an implementation manner.
Figure 4A:
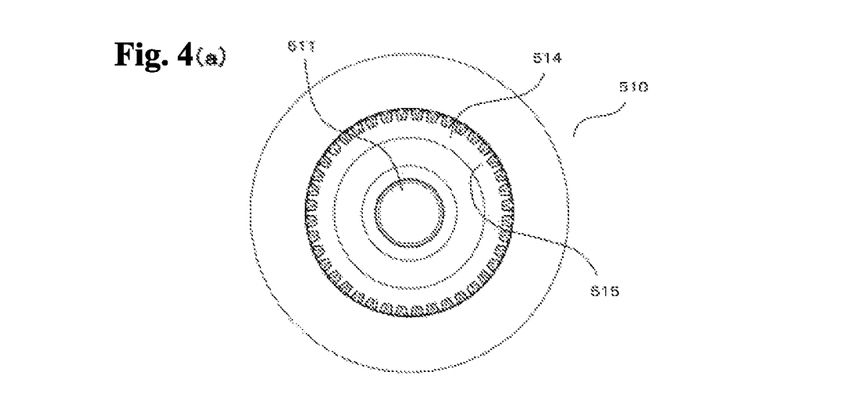
FIG. 4(a) is a diagram illustrating a structure of a wing belt wheel involved in an implementation manner.
Figure 4B:
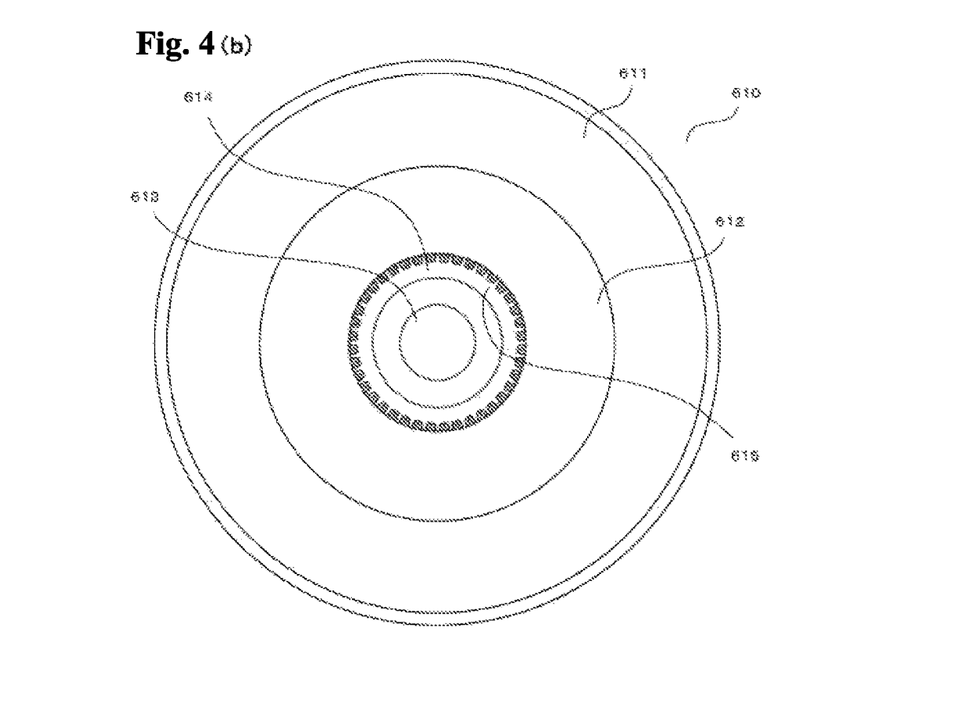
FIG. 4(b) is a diagram illustrating a structure of a drum belt wheel involved in an implementation manner.
Figure 5A:
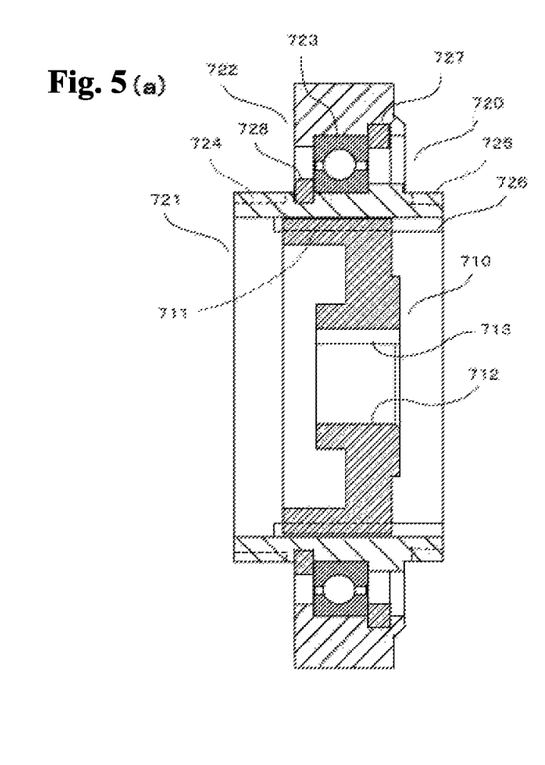
FIG. 5(a) is a diagram illustrating a structure of a clutch guider involved in an implementation manner.
Figure 5B:
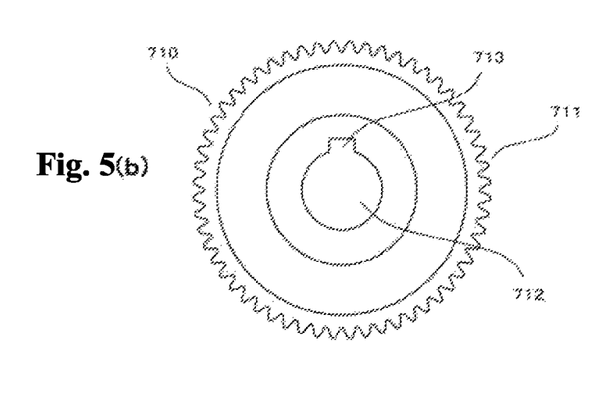
FIG. 5(b) is a diagram illustrating a structure of a clutch body involved in an implementation manner.
Figure 5C:
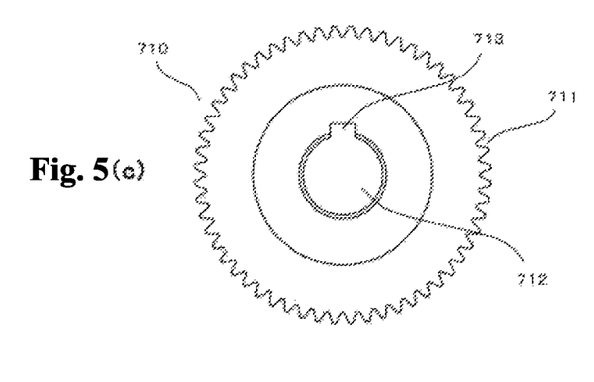
FIG. 5(c) is a diagram illustrating a structure of a clutch body involved in an implementation manner.
Figure 6A:
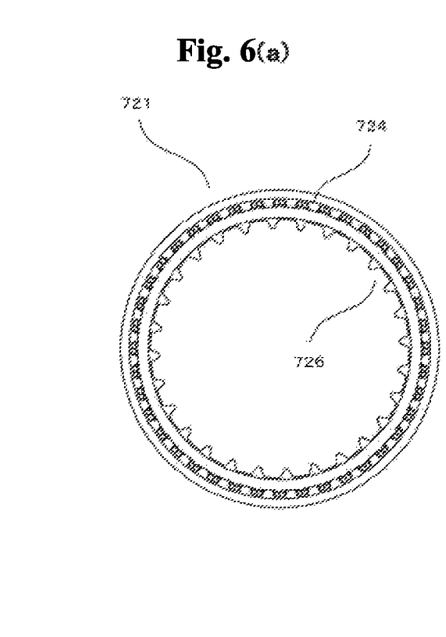
FIG. 6(a) is a diagram illustrating a structure of a clutch part forming the clutch body involved in an implementation manner.
Figure 6B:
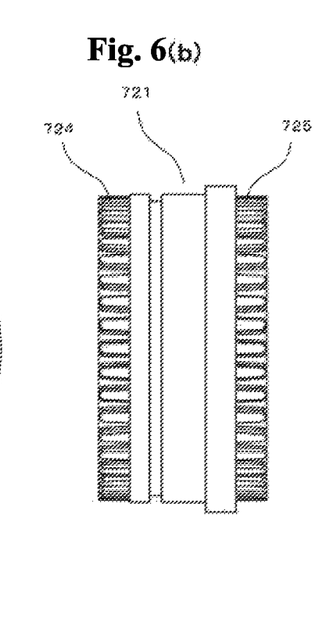
FIG. 6(b) is a diagram illustrating a structure of a clutch part forming the clutch body involved in an implementation manner.
Figure 6C:
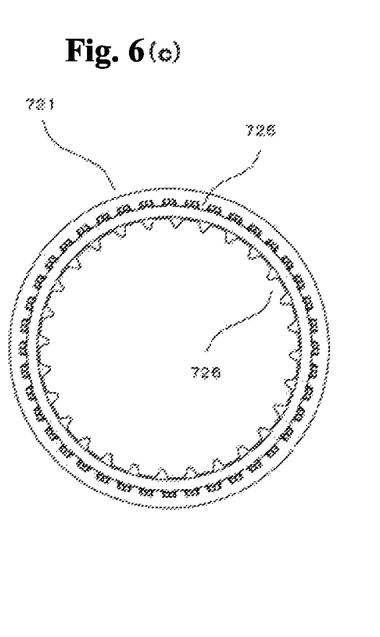
FIG. 6(c) is a diagram illustrating a structure of a clutch part forming the clutch body involved in an implementation manner.

FIG. 2 and FIG. 3 are sectional views illustrating the structure of the driving part 30. FIG. 2 is a sectional view illustrating a state that a driving form of the driving part 30 is switched to a biaxial driving form, and FIG. 3 is a sectional view illustrating a state that the driving form of the driving part 30 is switched to a uniaxial driving form. FIGS. 4(a)-(b) are diagrams illustrating a structure of a wing belt wheel 510 and a drum belt wheel 610. FIG. 4(a) is a view of the wing belt wheel 510 viewed from the front, and FIG. 4(b) is a view of the drum belt wheel 610 viewed from the rear. FIGS. 5(a)-(c) are diagrams illustrating a structure of a clutch guider 710 and a clutch body 720. FIG. 5(a) is side sectional view illustrating the clutch guider 710 and the clutch body 720, FIG. 5(b) is a view of the clutch guider 710 viewed from the front, and FIG. 5(c) is a view of the clutch guider 710 viewed from the rear. FIGS. 6(a)-(c) are diagrams illustrating a structure of a clutch part 721 forming the clutch body 720. FIG. 6(a) is a view of the clutch part 721 viewed from the front, FIG. 6(b) is a side view illustrating the clutch part 721, and FIG. 6(c) is a view of the clutch part 721 viewed from the rear.

The driving part 30 includes: a driving motor 100, a first rotating shaft 200, a second rotating shaft 300, a bearing unit 400, a wing speed-reducing mechanism 500, a drum speed-reducing mechanism 600 and a clutch mechanism part 700.

The driving motor 100 generates the torque used for driving the drum 22 and the rotating body 24. For example, the driving motor 100 is an outer rotor type DC (Direct Current) brushless motor, and a motor shaft 120 connected with a rotor in the shell 110 extends backwards from the shell 110.

The first rotating shaft 200 is in a hollow shape. The inner part, the front part and the rear part of the first rotating shaft 200 are respectively provided with a first sliding bearing 211 and a second sliding bearing 212, and the front end part of the first rotating shaft 200 is provided with a mechanical shaft seal 213.

The second rotating shaft 300 is wrapped in the first rotating shaft 200. The front part of the second rotating shaft 300 protrudes forwards from the first rotating shaft 200, and the rear part of the second rotating shaft 300 protrudes backwards from the first rotating shaft 200. An outer circumferential surface of the second rotating shaft 300 is supported by the first sliding bearing 211 and the second sliding bearing 212, and smoothly rotates in the first rotating shaft 200. In addition, the mechanical shaft seal 213 can prevent water from invading into a space between the second rotating shaft 300 and the first rotating shaft 200.

In the bearing unit 400, an approximate cylindrical bearing part 410 is arranged at the central part. In the bearing part 410, a first rolling bearing 411 and a second rolling bearing 412 are respectively arranged at the front part and the rear part, and a mechanical shaft seal 413 is arranged at the front end part. An outer circumferential surface of the first rotating shaft 200 is supported by the first rolling bearing 411 and the second rolling bearing 412, and smoothly rotates in the bearing part 410. In addition, the mechanical shaft seal 413 can prevent water from invading into the space between the first rotating shaft 200 and the bearing part 410. Further, a fixed flange part 420 is formed at the periphery of the bearing part 410 on the bearing unit 400.

In the fixed flange part 420, the bearing unit 400 is fixed on the rear surface of the outer tank 20 by a fixing method of a tightening screw and the like. Under the state that the bearing unit 400 is installed in the outer tank 20, the second rotating shaft 300 and the first rotating shaft 200 are faced with the inner part of the outer tank 20. The drum 22 is fixed in the first rotating shaft 200 by a screw not shown in the diagram, and the rotating body 24 is fixed in the second rotating shaft 300 by a screw 310.

The wing speed-reducing mechanism 500 includes: wing belt wheels 510, a first motor belt wheel 520 and a wing transmission belt 530. The rotation of the driving motor 100 is decelerated according to a speed reducing ratio determined by an outer diameter ratio of the wing belt wheels 510 to the first motor belt wheel 520 and is transmitted to the second rotating shaft 300.

The wing belt wheels 510 are supported by the rear end part of the second rotating shaft 300 in a freely rotatable manner. An insertion hole 511, in which the second rotating shaft 300 is inserted, is formed in the central part of the wing belt wheel 510, and two rolling bearings 512 and 513, which are arranged front and back, are clamped between the insertion holes 511 and the second rotating shaft 300. The wing belt wheels 510 smoothly rotate relative to the second rotating shaft 300 by the two rolling bearings 512 and 513.

As shown in FIG. 4(a), an annular engaged recess 514 is formed on the front surface of the wing belt wheel 510. A rack 515 is formed on an outer circumferential surface of the engaged recess 514 throughout the circumference. The racks 515 are equivalent to second engaged parts of the present disclosure. The wing belt wheels 510 can be prevented from falling off backwards by a fixing screw 320 installed at the rear end part of the second rotating shaft 300.

The first motor belt wheel 520 is installed at the front end part of the motor shaft 120 of the driving motor 100. The wing transmission belt 530 is erected between the wing belt wheels 510 and the first motor belt wheel 520.

The drum speed-reducing mechanism 600 includes: drum belt wheels 610, a second motor belt wheel 620 and a drum transmission belt 630. The rotation of the driving motor 100 is decelerated according to a speed reducing ratio determined by an outer diameter ratio of the drum belt wheels 610 to the second motor belt wheel 620 and is transmitted to the first rotating shaft 200.

The drum belt wheel 610 formed in a disc shape with the front surface being opened and includes: a belt part 611 and a fixing part 612 with an outer diameter less than that of the belt part 611. The outer diameter of the belt part 611, i.e. the outer diameter of the drum belt wheel 610, is greater than that of the wing belt wheel 510, and a speed reducing ratio of the drum speed-reducing mechanism 600 is much greater than that of the wing speed-reducing mechanism 500.

An insertion hole 613 is formed at the central part of the fixing part 612. The rear end part of the first rotating shaft 200 is inserted into the insertion holes 613, and the rear end part of the first rotating shaft 200 is fixed into the insertion holes 613 by a specified fixing method of pressing the racks and the like. Therefore, the drum belt wheels 610 are fixed on the rear end part of the first rotating shaft 200.

As shown in FIG. 4(b), an annular engaged recess 614 is formed on the outer circumference of the insertion hole 613 on the rear surface of the fixing part 612. A rack 615 is formed on an outer circumferential surface of the engaged recess 614 throughout the circumference. The racks 615 are equivalent to first engaged parts of the present disclosure.

The rear end part of the bearing part 410 is contained in the belt part 611 of a recess 616 sunken backwards. Therefore, the bearing unit 400 is overlapped with the drum belt wheels 610 along the front-and-back direction of the driving part 30.

The second motor belt wheel 620 is installed at a base part of the motor shaft 120 of the driving motor 100. The drum transmission belt 630 is erected between the drum belt wheels 610 and the second motor belt wheel 620.

In addition, the drum belt wheels 610 are equivalent to first transmission belts of the present disclosure, and the drum transmission belt 630 is equivalent to a first transmission belt of the present disclosure. In addition, the wing belt wheels 510 are equivalent to second transmission belts of the present disclosure, and the wing transmission belt 530 is equivalent to a second transmission belt of the present disclosure.

The clutch mechanism part 700 switches the driving form of the driving part 30 between the biaxial driving form and the uniaxial driving form; where the biaxial driving form is a form that enables the drum 22 and the rotating body 24 to rotate at different rotating speeds in a manner that the rotation of the wing belt wheels 510 can be transmitted to the second rotating shaft 300 through connection of the second rotating shaft 300 and the wing belt wheels 510, and the uniaxial driving form is a form that enables drum 22 and the rotating body 24 to rotate at a same rotating speed in a manner that the rotation of the drum belt wheels 610 can be transmitted to the second rotating shaft 300 through connection of the second rotating shaft 300 and the drum belt wheels 610. The biaxial driving form is equivalent to a first driving form of the present disclosure, and the uniaxial driving form is equivalent to a second driving form of the present disclosure.

The clutch mechanism part 700 includes: the clutch guider 710, the clutch body 720, a clutch lever 730, a lever supporting part 740 and a clutch driving apparatus 750.

The clutch guider 710 and the clutch body 720 are configured between the drum belt wheels 610 and the wing belt wheels 510 which are arranged along the axial direction of the first rotating shaft 200 and the second rotating shaft 300.

As shown in FIGS. 5(*a*)-(*c*), the clutch guider 710 is in a cylindrical shape with the front surface being opened. A rack 711 is formed on an outer circumferential surface of the clutch guider 710 throughout the circumference. An insertion hole 712 is formed at the central part of the clutch guider 710. A key groove 713 is formed in the insertion hole 712. The second rotating shaft 300 penetrates through the insertion hole 712 of the clutch guider 710 and is fixed by a fixing method of using the key groove 713 and a key not shown in the diagram. Therefore, the clutch guider 710 rotates together with the second rotating shaft 300.

As shown in FIG. 5(*a*), the clutch body 720 includes the clutch part 721, an encircling part 722 and a rolling being 723. The clutch part 721 is in a cylindrical shape with the front surface and the rear surface being opened. As shown in FIGS. 6(*a*)-(*c*), a front rack 724 and a rear rack 725 are respectively formed on the whole circumference of an outer circumferential surface of the front part and the rear part of the clutch part 721. The front rack 724 is equivalent to a first engaging part of the present disclosure, and the rear rack 725 is equivalent to a second engaging part of the present disclosure.

An inner diameter of the clutch part 721 is approximately equal to an outer diameter of the clutch guider 710, and the front-and-back dimension of the clutch part 721 is set to be greater than that of the clutch guider 710. The clutch guider 710 is inserted in the clutch part 721. An inner rack 726 is formed on the inner circumferential surface of the clutch part 721 throughout the circumference and is meshed with the rack 711 of the clutch guider 710. The front-and-back dimension of the inner rack 726 is set to be greater than that of the rack 711.

Through the engagement of the inner rack 726 and the rack 711, the clutch part 721 may be in the following state: the clutch part 721 can move to the axial direction of the second rotating shaft 300 relative to the clutch guider 710, i.e. the second rotating shaft 300 where the clutch guider 710 is fixed, and can rotate together with the second rotating shaft 300.

The encircling part 722 is in a ring shape and encircles the central part of the clutch part 721 in a manner that the clutch part 721 rotates freely. A rolling bearing 723 is arranged between the clutch part 721 and the encircling part 722. The rolling bearing 723 is fixed by two buckling rings 727 and 728 in different sizes, so as not to move front and back. The clutch part 721 smoothly rotates relative to the encircling part 722 by the rolling bearing 723.

The upper end part of the clutch lever 730 is rotatably connected with the encircling part 722 relative to the encircling part 722. In addition, the clutch lever 730 is rotatably supported on a supporting shaft 741 arranged on the lever supporting part 740.

The clutch driving apparatus 750 includes: an actuator 751 and an operating lever 752. The actuator 751 enables the operating lever 752 to move front and back. The operating lever 752 is connected with the lower end part of the clutch lever 730. The lower end part of the clutch lever 730 can rotate relative to the operating lever 752.

The lever supporting part 740 and the clutch driving apparatus 750 are fixed on a mounting plate not shown in the diagram, and the mounting plate is installed on the bearing unit 400 or the outer tank 20.

In addition, the clutch lever 730, the lever supporting part 740 and the clutch driving apparatus 750 form mobile mechanism parts of the present disclosure.

Under the situation that the driving form of the driving part 30 is switched from the uniaxial driving form to the biaxial driving form, as shown in FIG. 2, the operating lever 752 is pushed out from interior of the actuator 751 to the front. The lower end part of the clutch lever 730 is pushed by the operating lever 752 to move forwards, and the clutch lever 730 rotates backwards by using the supporting shaft 741 as the center. The upper end part of the clutch lever 730 moves backwards, and the clutch body 720 is pushed by the upper end part of the clutch lever 730 to move backwards. Therefore, the rear rack 725 of the clutch part 721 is engaged with the racks 515 of the wing belt wheels 510.

When the rear rack 725 is engaged with the racks 515, since the clutch part 721 and the wing belt wheels 510 are fixed in the rotating direction, the rotation of the wing belt wheels 510 can be transmitted to the second rotating shaft 300 by the clutch part 721 and the clutch guider 710. Under this state, when the driving motor 100 rotates, the rotation is transmitted to the second rotating shaft 300 by the wing speed-reducing mechanism 500, and the rotating body 24 fixed at the second rotating shaft 300 rotates. The rotating body 24 rotates at a rotating speed of the driving motor 100, which is a rotating speed formed after a speed reducing ratio of the speed-reducing mechanism 500 is decreased. In addition, the rotation of the driving motor 100 is transmitted to the first rotating shaft 200 by the drum speed-reducing mechanism 600, and the drum 22 fixed at the first rotating shaft 200 rotates. The drum 22 rotates at rotating speed of the driving motor 100, which is a rotating speed formed after the speed reducing ratio of the drum speed-reducing mechanism 600 is decreased. As described above, since the speed reducing ratio of the drum speed-reducing mechanism 600 is greater than that of the speed-reducing mechanism 500, the rotating body 24 rotates at a rotating speed higher than that of the drum 22 and in the same direction as that of the drum 22.

Herein, although the cutch part 721 rotates together with the wing belt wheels 510, the rotation of the cutch part 721 is hardly transmitted to the clutch lever 730 even if the cutch part 721 rotates since the clutch lever 730 is connected with the encircling part 722 which is connected with the cutch part 721 in a freely rotatable state.

In another aspect, under the situation that the driving form of the driving part 30 is switched from the biaxial driving form to the uniaxial driving form, as shown in FIG. 3, the operating lever 752 is pulled in the actuator 751, namely, the operating lever 752 moves backwards. The lower end part of the clutch lever 730 is pulled by the operating lever 752 to move backwards, and the clutch lever 730 rotates forwards by using the supporting shaft 741 as the center. The upper end part of the clutch lever 730 moves forwards, and the clutch body 720 is pushed by the upper end part of the clutch lever 730 to move forwards. Therefore, the front rack 724 of the cutch part 721 is engaged with the racks 615 of the drum belt wheels 610.

When the front rack 724 is engaged with the racks 615, it is in a state that the rotation of the drum belt wheels 610 can be transmitted to the second rotating shaft 300 by the cutch part 721 and the clutch guider 710 since the cutch part 721 and the drum belt wheels 610 are fixed in the rotating direction. Under this state, when the driving motor 100 rotates, the rotation is transmitted to the first rotating shaft 200 and the second rotating shaft 300 by the drum speed-reducing mechanism 600, so that the drum 22 and the rotating body 24 rotate. The drum 22 and the rotating body 24 integrally rotate at a rotating speed of the driving motor 100, which is a rotating speed formed after the speed reducing ratio of the drum speed-reducing mechanism 600 is decreased in the same direction.

In addition, in the uniaxial driving form, when the driving motor 100 rotates, the wing belt wheels 510 also rotate along with the rotation. However, the wing belt wheels 510 only idle relative to the second rotating shaft 300, and the rotation of the wing belt wheels 510 would not be transmitted to the second rotating shaft 300.

Then, the drum washing machine 1 carries out washing operations in various operation modes. The washing operations includes: a washing process, an intermediate dewatering process, a rinsing process and a final dewatering process.

The driving form of the driving unit 30 is switched to the biaxial driving form in the washing process and the rinsing process. Under the state that water not reaching the specified water level lower at the lower edge of the throwing opening 11 is stored in the outer tank 20, the driving motor 100 alternately performs right rotation and left rotation. Therefore, the drum 22 and the rotating body 24 alternately perform right rotation and left rotation under the condition that the rotating speed of the rotating body 24 is higher than that of the drum 22. At this time, the rotating speed of the drum 22 is set as a rotating speed that the centrifugal force acting on the washings in the rotating speed of the drum 22 is less than the gravity of the washings.

When the drum 22 and the rotating body 24 rotate, the washings in the drum 22 are lifted up and dropped down by the baffles 23, so that the washings are thrown to the inner circumferential surface of the drum 22. In addition, at the rear part of the drum 22, the washings are in contact with the protruding parts 24a of the rotating body 24 which is rotating, the washings are rubbed by the protruding parts 24a, and the washings are stirred by the protruding parts 24a. Therefore, the washings are washed and rinsed.

In this way, during washing and rinsing, since not only the mechanical force generated by the rotation of the drum 22, but also the mechanical force generated by the rotation of the rotating body 24, are applied to the washings, so as to expect the improvement of detergency. Then, in the intermediate dewatering process and the final dewatering process, the driving form of the driving part 30 is switched to the uniaxial driving form. The driving motor 100 rotates at a high speed in one direction, and the drum 22 and the rotating body 24 integrally rotate at a rotating speed that the centrifugal force acting on the washings in the drum 22 is far more than the gravity of the washings. The washings are thrown on the inner circumferential surface of the drum 22 by the centrifugal force to perform dewatering.

In this way, during dewatering, since the drum 22 and the rotating body 24 integrally rotate, the washings attached to the drum 22 are well dewatered without stirring of the rotating body 24.

<Effects of the Implementation Manner>

According to the implementation manner, since the drum 22 and the rotating body 24 can generate a rotating speed difference by using a simple structure of the speed-reducing mechanisms of the belts and the belt wheels, the reliability of the driving part 30 can be improved in the aspects of fault and the like compared with the use of a speed-reducing mechanism of gears. Additionally, since the drum 22 and the rotating body 24 are enabled to rotate by using one driving motor 100, the driving part 30 is formed at low cost; and in the second driving form, even though the condition that the drum 22 and the rotating body 24 bear different sizes of loads such as the washings and the like is generated, the drum 22 and the rotating body 24 are also difficult to rotate at different rotating speeds, so it is not easy to generate a condition of hindering proper dewatering.

Further, according to the present implementation manner, the clutch mechanism part 700 can be realized. Under the condition that the driving part 30 adopts the structure of the speed-reducing mechanisms of the belts and the belt wheels, the clutch mechanism part 700 can well switch the driving form of the driving part 30 between the biaxial driving form and the uniaxial driving form by the clutch body 720 configured between the drum belt wheels 610 and the wing belt wheels 510 as well as the clutch lever 730 and the clutch driving apparatus 750 configured to enable the clutch body 720 to move.

Further, according to the present implementation manner, since the encircling part 722 for encircling the clutch part 721 in a freely rotatable state is arranged, and the encircling part 722 is connected with the clutch lever 730, the non-rotatable mobile mechanism parts are used for enabling the rotatable clutch part 721 to move to the axial direction of the second rotating shaft 300.

Further, according to the present implementation manner, since the bearing unit 400 is overlapped with the drum belt wheels 610 located along the front-and-back direction of the driving part, the dimension in the front-and-back direction of the driving part 30 can be decreased. Therefore, since the outer tank 20 and the drum 22 can be enlarged in the front-and-back direction, the washing capacity can be increased.

Further, according to the present implementation manner, in the uniaxial driving form, in order to realize the rotation of the wing belt wheels 510, the second rotating shaft 300 is also used as the supporting shaft for supporting the wing belt wheels 510 in a freely rotatable manner. Therefore, since a supporting shaft does not need to be additionally arranged, the cost can be reduced; and in addition, under the condition that the supporting shaft is arranged, shaft alignment between the supporting shaft and the second rotating shaft 300 is not needed, so that the assembling operation of the driving part 30 becomes easy.

Change Example 1

In the above implementation manner, the driving form of the driving part 30 is switched between the biaxial driving form that enables the drum 22 and the rotating body 24 to rotate at different rotating speeds and the uniaxial driving form that enables the drum 22 and the rotating body 24 to integrally rotate at the same rotating speed.

Relatively, in the change example, the driving form of the driving part 30 can not only be switched to the biaxial driving form and the uniaxial driving form, but also can be switched to a drum monomer driving form that enables the drum 22 to rotate while the rotating body 24 is in a freely rotatable state. The drum monomer driving form is equivalent to a third driving form of the present disclosure.

Figure 7:
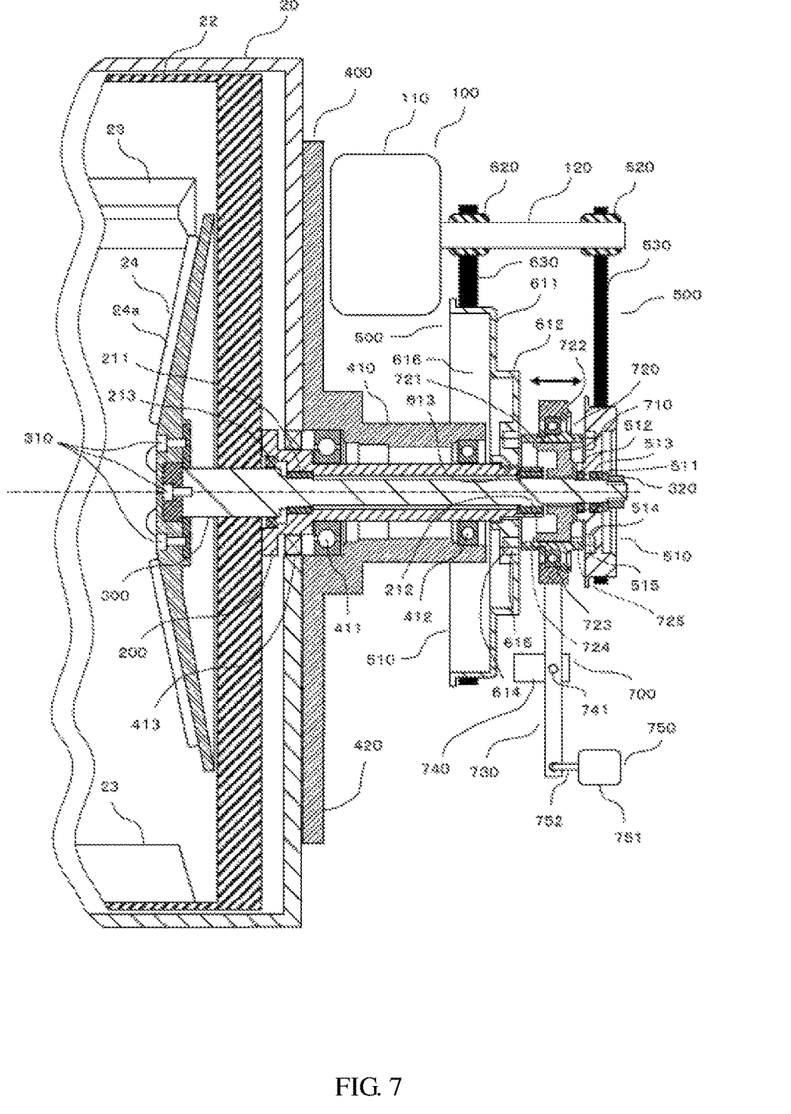
FIG. 7 is a diagram illustrating a driving part in a state of switching to a drum monomer driving form involved in a change example 1.

FIG. 7 is a diagram illustrating the driving part 30 in a state of switching to the drum monomer driving form involved in the change example.

As shown in FIG. 7, in the drum monomer driving form, the front rack 724 is not engaged with the racks 615 of the drum belt wheels 610 by the clutch lever 730, and the clutch part 721 also moves to the position at which the rear rack 725 is also not engaged with the wing belt wheels 510. Namely, the second rotating shaft 300 of the clutch mechanism part 700 is connected with neither the drum belt wheels 610 nor the wing belt wheels 510.

Under this state, when the driving motor 100 rotates, the rotating body 24 does not rotate since the rotation of the belt wheels 510 and 610 is not transmitted to the second rotating shaft 300 though the drum 22 rotates. However, since the second rotating shaft 300 can rotate relative to the first rotating shaft 200, the rotating body 24 becomes a freely rotatable state.

For example, in the washing process or the rinsing process, the driving form is switched to the drum monomer driving form. Under the state that the water is stored in the outer tank 20, when the driving motor 100 rotates, the drum 22 rotates, and the washings are stirred by the baffles 23.

At this time, at the front side of the drum 22, since the washings are lifted near the right upper part of the drum 22 and dropped down by the baffles 23, the washings almost rotate twice when the drum 22 completes one rotation. In another aspect, at the rear side of the drum 22, the washings easily become a state of being pressed by the rotating body 24. As described above, since the rotating body 24 is in a freely rotatable state, the rotating body 24 also easily rotates together with the washings when the washings are stirred by the baffles 23 to rotate. Therefore, either at the rear side of the drum 22 or at the front side of the drum 22, the washings almost rotate twice when the drum 22 completes one rotation. Therefore, the rotating difference of the washings is not easy to be generated at the front side and the rear side of the drum 22, so it is not easy to generate twisting of the washings caused by the rotating difference.

In addition, under the situation that the rotating body 24 cannot freely rotate relative to the drum 22, at the rear side of the drum 22, when the washings are pushed and pressed to the rotating body 24 and are stirred by the baffles, the washings will not drop near the right upper part of the drum 22 and become a state of being attached to the rotating body 24 to rotate. In this way, at the rear side of the drum 22, since the washings only almost realize one rotation when the drum 22 completes one rotation, the rotating difference of the washings is generated at the front side and the rear side of the drum 22, so the washings are easily twisted.

In addition, in the drum monomer driving form different from the biaxial driving form, since the rotating body 24 cannot rotate by the driving motor, the washings cannot be rubbed by the rotating body 24.

In this way, in the washing process and the rinsing process, under the situation that the driving motor 100 is operated in the drum monomer driving form, the damage caused by the twisting and the friction of the washings is not easy to be generated. Therefore, according to the change example, gracile clothes can be washed and rinsed while the damage to the gracile clothes is inhibited.

Change Example 2

Figure 8:
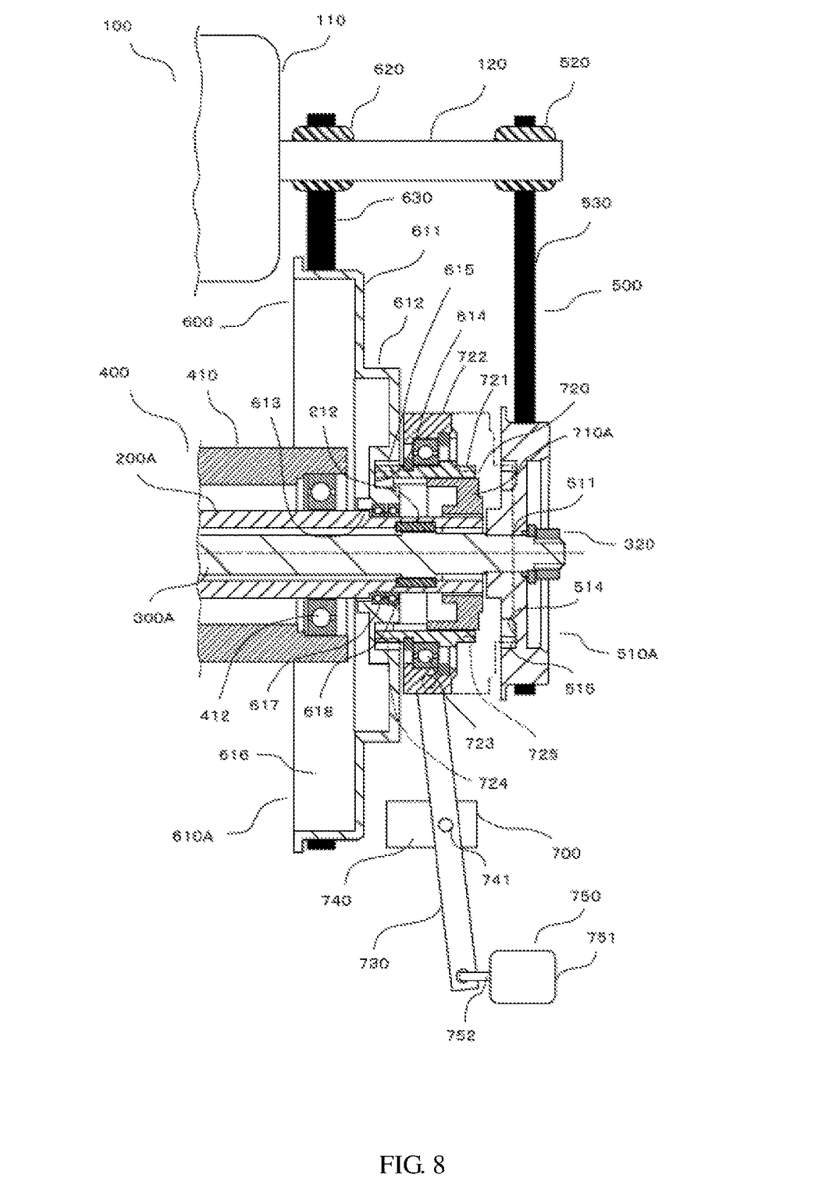
FIG. 8 is a diagram illustrating a structure of a driving part involved in a change example 2.

FIG. 8 is a diagram illustrating a structure of the driving part 30 involved in the change example. FIG. 8 is an enlarged view of a rear part of the driving part 30.

In the above implementation manner, the drum belt wheels 610 are fixed at the rear end part of the first rotating shaft 200, and the wing belt wheels 510 are installed at the rear end part of the second rotating shaft 300 by the two rolling bearings 512 and 513, which are arranged front and back, in a manner that the wing belt wheels 510 freely rotate relative to the second rotating shaft 300. Further, the clutch guider 710 is fixed on the second rotating shaft 300.

Relatively, in the present change example, as shown in FIG. 8, wing belt wheels 510A are fixed at the rear end part of a second rotating shaft 300A by a fixing method of pressing racks and the like. In addition, drum belt wheels 610A are installed at the rear end part of the second rotating shaft 300A by a rolling bearing 617 and a rolling bearing 618, which are arranged front and back, in a manner that the drum belt wheels 610A freely rotate relative to a first rotating shaft 200A. Further, a clutch guider 710A is fixed at the first rotating shaft 200A.

In the present change example, when the driving form is switched to the biaxial driving form, as shown in FIG. 8, the clutch part 721 moves to one side of the drum belt wheel 610A, and the front rack 724 is engaged with the racks 615. Therefore, the drum washing machine becomes a state that the rotation of the drum belt wheels 610A is transmitted to the first rotating shaft 200A by the clutch part 721 and the clutch guider 710A. Under this state, when the driving motor 100 rotates, the rotation is transmitted to the first rotating shaft 200A by the drum speed-reducing mechanism 600, so that the drum 22 fixed at the first rotating shaft 200A rotates. In addition, the rotation of the driving motor 100 is transmitted to the second rotating shaft 300A through the wing speed-reducing mechanism 500, so that the rotating body 24 fixed at the second rotating shaft 300A rotates. In this way, the rotating body 24 rotates at a rotating speed higher than that of the drum 22 and in the same direction as that of the drum 22.

In another aspect, when the driving form is switched to the uniaxial driving form, as shown by dotted lines in FIG. 8, the clutch part 721 moves to one side of the wing belt wheel 510A, and the rear rack 725 is engaged with the racks 515. Therefore, the drum washing machine becomes a state that the rotation of the wing belt wheels 510A is transmitted to the first rotating shaft 200A by the clutch part 721 and the clutch guider 710. Under this state, when the driving motor 100 rotates, the rotation is transmitted to the first rotating shaft 200A and the second rotating shaft 300A by the wing speed-reducing mechanism 500, so that the drum 22 and the rotating body 24 rotate. Namely, the drum 22 and the rotating body 24 integrally rotate in the same direction at the same rotating speed.

According to the present change example, the effects identical with those of the above implementation manner can also be performed.

In addition, in the present change example, the drum belt wheels 610A are equivalent to second transmission belts of the present disclosure, and the drum transmission belt 630 is equivalent to a second transmission belt of the present disclosure. In addition, the wing belt wheels 510A are equivalent to first transmission belts of the present disclosure, and the wing transmission belt 530 is equivalent to a first transmission belt of the present disclosure.

Other Change Examples

Although the implementation manner of the present disclosure is described above, the present disclosure is not limited by the above implementation manner. In addition, various changes can also be made to the implementation manner of the present disclosure in addition to the above description.

For example, in the above implementation manner, the clutch part 721 and the drum belt wheels 610 are fixed in the rotating direction through engagement of the front rack 724 of the clutch part 721 and the racks 615 of the drum belt wheels 610. In addition, the clutch part 721 and the wing belt wheels 510 are fixed in the rotating direction through engagement of the rear rack 725 of the clutch part 721 and the racks 515 of the wing belt wheels 510. However, the structure that the front part of the clutch part 721 is engaged with the drum belt wheels 610 and the structure that the rear part of the clutch part 721 is engaged with the wing belt wheels 510 are not limited to the above implementation manner, and can also be designed into other structures. For example, a structure that bulges are formed at the front part and the rear part of the clutch part 721, recesses or holes are formed in the drum belt wheels 610 and the wing belt wheels 510, and the bulges are embedded into the recesses or the holes can be adopted.

In addition, in the above implementation manner, the two rolling bearings 512 and 513 are arranged between the wing belt wheels 510 and the second rotating shaft 300. In addition, the rolling bearing 723 is arranged between the clutch part 721 and the encircling part 722. However, the rolling bearings 512, 513 and 723 can also be replaced by sliding bearings. Similarly, the rolling bearings 617 and 618 in the above change example 2 can also be replaced by the sliding bearings.

Further, in the above implementation manner, the drum 22 rotates by using an inclination axis inclining relative to the horizontal direction as the center. However, the drum washing machine 1 may also adopt a structure that the drum 22 rotates by using the horizontal axis as the center.

Further, although the drum washing machine 1 in the above implementation manner does not have the drying function, the present disclosure can also be used for a drum washing machine with the drying function, i.e. a drum-type drying and washing machine.

Additionally, various changes can be appropriately made to the implementation manner of the present disclosure within the scope of the technical idea shown in the claims.

A LIST OF REFERENCE NUMERALS

10: Shell; 20: Outer tank; 22: Drum; 24: Rotating body; 24*a*: Protruding part; 30: Driving part; 100: Driving motor; 200: First rotating shaft; 300: Second rotating shaft; 400: Bearing unit; 410: Bearing part; 500: Wing speed-reducing mechanism; 510: Wing belt wheels (second belt wheel and first belt wheel); 515: Rack (second engaged part); 530: Wing transmission belt (second transmission belt); 600: Drum speed-reducing mechanism; 610: Drum belt wheels (first belt wheel and second belt wheel); 615: Rack (first engaged part); 616: Recess; 630: Drum transmission belt (first transmission belt); 700: Clutch mechanism part; 720: Clutch body; 721: Clutch part; 722: Encircling part; 724: Front rack (first engaging part); 725: Rear rack (second engaging part); 730: Clutch lever (mobile mechanism part); 740: Lever supporting part (mobile mechanism part); 750: Clutch driving apparatus (mobile mechanism part).

What is claimed is:

1. A drum washing machine, comprising:
    an outer tank, configured in a shell;
    a drum, configured in the outer tank and capable of rotating by using a horizontal axis or an inclination axis inclining relative to a horizontal direction as a center;
    a rotating body, configured at a rear part of the drum and provided with a protruding part in contact with washings on the surface of the rotating body; and
    a driving part, configured to enable the drum and the rotating body to rotate, wherein
    the driving part comprises:
    a driving motor;
    a first rotating shaft, fixed on the drum;
    a second rotating shaft, fixed on the rotating body;
    a first belt wheel, fixed on one of the first rotating shaft and the second rotating shaft and connected with the driving motor by a first transmission belt;
    a second belt wheel, connected with the driving motor by a second transmission belt and having an outer diameter different from that of the first belt wheel, wherein the second belt wheel is supported on the other one of the first rotating shaft and the second rotating shaft in a freely rotatable manner; and
    a clutch mechanism part, configured to switch a driving form of the driving part between a first driving form and a second driving form, wherein the first driving form is a form that enables the drum and the rotating body to rotate at different rotating speeds through connecting the other one of the first rotating shaft and the second rotating shaft with the second belt wheel in a manner of enabling rotation of the second belt wheel to be transmitted to the other one of the first rotating shaft and the second rotating shaft; and the second driving form is a form that enables the drum and the rotating body to rotate at a same rotating speed through connecting the other one of the first rotating shaft and the second rotating shaft with the first belt wheel in a manner of enabling rotation of the first belt wheel to be transmitted to the other one of the first rotating shaft and the second rotating shaft.

2. The drum washing machine according to claim 1, wherein
    the second rotating shaft is wrapped in the first rotating shaft and rotates coaxially with the first rotating shaft;
    the first belt wheel and the second belt wheel are parallelly configured along an axial direction of the first rotating shaft and the second rotating shaft;
    the clutch mechanism part comprises:
    a clutch part, configured between the first belt wheel and the second belt wheel, capable of moving to the axial direction relative to the other one of the first rotating shaft and the second rotating shaft and capable of rotating simultaneously with the other one of the first rotating shaft and the second rotating shaft; and
    mobile mechanism parts, configured to enable the clutch part to move to the axial direction, wherein
    a side of the first belt wheel and a side of the second belt wheel of the clutch part are respectively provided with a first engaging part and a second engaging part, and a first engaged part and a second engaged part are respectively arranged on the first belt wheel and the second belt wheel;
    the first driving form becomes a state that the clutch part moves to the side of the second belt wheel by the mobile mechanism parts so that the second engaging part is engaged with the second engaged part, and the rotation of the second transmission belt is transmitted to the other one of the first rotating shaft and the second rotating shaft by the clutch part; and
    the second driving form becomes a state that the clutch part moves to the side of the first belt wheel by the mobile mechanism parts so that the first engaging part is engaged with the first engaged part, and the rotation of the first belt wheel is transmitted to the other one of the first rotating shaft and the second rotating shaft by the clutch part.

3. The drum washing machine according to claim 2, wherein
    the first belt wheel is fixed on the first rotating shaft;

the driving form of the driving part comprises a third driving form that enables the drum to rotate and enables the rotating body to be in a freely rotatable state; and the second rotating shaft is not connected with any of the first belt wheel and the second belt wheel when the clutch mechanism part is in the third driving form.

4. The drum washing machine according to claim 2, wherein the driving part is provided with a bearing part supporting the first rotating shaft in a freely rotatable manner in the front of a front one of the first belt wheel and the second belt wheel, and a recess configured to contain at least part of the bearing part is formed at one side of the front one of the first belt wheel and the second belt wheel, which faces to the bearing part.

5. The drum washing machine according to claim 4, wherein the first belt wheel is fixed on the first rotating shaft;

the driving form of the driving part comprises a third driving form that enables the drum to rotate and enables the rotating body to be in a freely rotatable state; and the second rotating shaft is not connected with any of the first belt wheel and the second belt wheel when the clutch mechanism part is in the third driving form.

6. The drum washing machine according to claim 2, wherein the clutch mechanism part comprises an encircling part that encircles the clutch part in a manner that the clutch part freely rotates; and the mobile mechanism parts are connected with the encircling part.

7. The drum washing machine according to claim 6, wherein the first belt wheel is fixed on the first rotating shaft;

the driving form of the driving part comprises a third driving form that enables the drum to rotate and enables the rotating body to be in a freely rotatable state; and the second rotating shaft is not connected with any of the first belt wheel and the second belt wheel when the clutch mechanism part is in the third driving form.

8. The drum washing machine according to claim 6, wherein the driving part is provided with a bearing part supporting the first rotating shaft in a freely rotatable manner in the front of a front one of the first belt wheel and the second belt wheel, and a recess configured to contain at least part of the bearing part is formed at one side of the front one of the first belt wheel and the second belt wheel, which faces to the bearing part.

9. The drum washing machine according to claim 8, wherein the first belt wheel is fixed on the first rotating shaft;

the driving form of the driving part comprises a third driving form that enables the drum to rotate and enables the rotating body to be in a freely rotatable state; and the second rotating shaft is not connected with any of the first belt wheel and the second belt wheel when the clutch mechanism part is in the third driving form.

10. The drum washing machine according to claim 1, wherein the first belt wheel is fixed on the first rotating shaft;

the driving form of the driving part comprises a third driving form that enables the drum to rotate and enables the rotating body to be in a freely rotatable state; and the second rotating shaft is not connected with any of the first belt wheel and the second belt wheel when the clutch mechanism part is in the third driving form.

* * * * *